United States Patent
Barrie et al.

(10) Patent No.: US 12,202,390 B2
(45) Date of Patent: Jan. 21, 2025

(54) WHOLE BODY VIBRATION TRANSMISSION REDUCTION DEVICE

(71) Applicant: University of Guelph, Guelph (CA)

(72) Inventors: Alexander Barrie, Bowmanville (CA); Michele Oliver, Cambridge (CA); Marwan Hassan, Guelph (CA)

(73) Assignee: UNIVERSITY OF GUELPH, Ontario (CA)

( * ) Notice: Subject to any disclaimer, the term of this patent is extended or adjusted under 35 U.S.C. 154(b) by 523 days.

(21) Appl. No.: 17/612,011

(22) PCT Filed: May 15, 2020

(86) PCT No.: PCT/CA2020/050664
§ 371 (c)(1),
(2) Date: Nov. 17, 2021

(87) PCT Pub. No.: WO2020/232538
PCT Pub. Date: Nov. 26, 2020

(65) Prior Publication Data
US 2022/0134920 A1    May 5, 2022

Related U.S. Application Data

(60) Provisional application No. 62/849,529, filed on May 17, 2019.

(51) Int. Cl.
*B60N 2/50* (2006.01)
*B60N 2/64* (2006.01)
*F16F 13/00* (2006.01)

(52) U.S. Cl.
CPC ............ *B60N 2/501* (2013.01); *B60N 2/502* (2013.01); *B60N 2/508* (2013.01); *B60N 2/64* (2013.01);
(Continued)

(58) Field of Classification Search
CPC . B60N 2/50; B60N 2/64; B60N 2/501; B60N 2/502; B60N 2/508; B60N 2/522; F16F 13/005; F16F 15/022; F16F 15/002
(Continued)

(56) References Cited

U.S. PATENT DOCUMENTS 6,697,723 B2 *  2/2004  Olsen .................. B60R 21/0156
                                                           280/735
10,967,766 B2 * 4/2021  Schoenbach ......... B60N 2/4228
(Continued)

FOREIGN PATENT DOCUMENTS

CN          109515269 B  * 12/2023  ............... B60N 2/52

OTHER PUBLICATIONS

International Search Report from related PCT Application No. PCT/CA2020/050664, dated May 15, 2020 (3 pages).
(Continued)

*Primary Examiner* — Robert A. Siconolfi
*Assistant Examiner* — San M Aung
(74) *Attorney, Agent, or Firm* — Grossman, Tucker, Perreault & Pfleger, PLLC (57) ABSTRACT

A vibration damping device for reducing transmissibility of an excitation frequency comprising: a top plate; a bottom plate secured to a base; a linkage arm arrangement coupled to the top plate and the bottom plate; at least one resilient member coupled to the top plate and the bottom plate; a load sensor for determining a mass of a load on the top plate; at least one accelerometer; a damper coupled to the linkage arm arrangement and the top plate, wherein the damper is controllable to modify stiffness of the device.

16 Claims, 10 Drawing Sheets

(52) U.S. Cl.
CPC ...... *F16F 13/005* (2013.01); *F16F 2228/066* (2013.01); *F16F 2232/08* (2013.01)

(58) Field of Classification Search
USPC .......................................................... 267/131
See application file for complete search history.

(56) References Cited

U.S. PATENT DOCUMENTS

| 2003/0163234 | A1* | 8/2003 | Olsen | G01G 19/4142 |
| | | | | 701/45 |
| 2018/0134192 | A1* | 5/2018 | Wittenschlaeger | B60N 2/525 |
| 2020/0391632 | A1* | 12/2020 | Wittmann | B60N 2/501 |

OTHER PUBLICATIONS

Written Opinion from elated PCT Application No. PCT/CA2020/050664, dated Aug. 14, 2020 (4 pages).

* cited by examiner

WHOLE BODY VIBRATION TRANSMISSION REDUCTION DEVICE

FIELD

The present disclosure relates generally to reducing the transmission of whole-body vibrations.

BACKGROUND

Operators of heavy equipment vehicles, such as tractors, backhoes and graders, are often exposed to whole body vibrations (WBV) that are transmitted via the operator's seat. Exposure to prolonged whole body vibration not only causes fatigue and reduces productivity to operators, it also poses risks of injury to operators.

The frequency range of whole body vibrations is considered to be 0.5 Hz to 80 Hz, and operators of heavy vehicles are typically exposed to dominant frequencies of whole body vibrations below 20 Hz. However, the perception of the vibration is dependent on the magnitude and frequency. For example, the perception of vertical axis vibration is highest between 5-10 Hz.

Reducing whole body vibrations exposure to the operator is typically achieved by limiting transmissibility through the operator seat. Accordingly, several methods have been proposed to limit exposure to operator whole body vibrations. One such method involves selecting an appropriate vehicle axle suspension, however, the addition of a suspension system to a vehicle or a vehicle operator seat does not guarantee that vibration transmission to the operator will be reduced.

In a typical mass-spring system, transmissibility is dependent on input vibration frequency, and therefore an appropriate spring rate is selected to reduce the natural frequency on of the spring-mass system under forced excitation to a frequency that is much lower than the excitation frequency $\omega$. Accordingly, damping is added to the system to reduce peak transmissibility when the input is at or below the natural frequency. The addition of a damper, however, reduces attenuation for the higher frequency input and thus passive suspension systems with a spring and a damper are designed as a compromise to achieve a desired level of performance in these two frequency ranges. Generally, vibration amplification occurs at frequencies less than the cut-off frequency, $\sqrt{2}*\omega_n$, where $\omega_n$ is the natural frequency of the seat suspension. The addition of damping to a seat suspension is required to reduce the magnitude of the amplification below the cut-off frequency, but at frequencies higher than the cut-off frequency, damping is undesirable.

The American Society of Agricultural and Biological Engineers (ASABE) guidelines for operator seats in agricultural equipment suggests a lower limit of 0.8 Hz for the natural frequency of typical seat suspensions due, in part, to the physical limitations of mechanical linkages and steel springs. This means that attenuation of frequencies of 1.13 Hz or less would be unobtainable with typical passive seat suspensions. The ASABE guideline suggests a damping ratio of 30 to 50 percent of critical damping for the seat suspension. In one study, seat suspension design was investigated by comparing different perceived discomfort weight functions and using a lumped parameter model to determine seat stiffness and damping values, and it was determined that minimum stiffness and damping parameters varied highly depending on the standard used.

One method for limiting exposure to whole body vibrations involves changing the operator's seat with seat suspension systems that incorporate smart technology, however, such systems can be expensive and require substantial modifications. For vibration isolation of industrial systems, such as rotating machinery, reducing the natural frequency of the system may be readily accomplished since the excitation frequencies are generally fixed above 10 Hz and the stiffness of the isolating device is normally not limited by static deflection requirements.

Active and semi-active suspension systems use the system response in order to adjust the damping and spring constants to decrease transmissibility over the entire whole body vibrations frequency spectrum. Active systems can reduce transmissibility by producing a counteracting force to the input force, which in turn, cancels out the motion. These systems are typically more complex and require either electrical or fluid power to provide the restoring force to the system. Alternatively, semi-active systems use a device that can provide a reactive force to the input vibration by modifying either the stiffness or the damping force.

While active and semi-active suspension systems are becoming more prevalent in heavy equipment vehicles and passenger vehicles, these systems are limited to newer vehicle models or to dedicated seat suspension systems which may not readily fit into older vehicles. Some older vehicles may also not have provisions to supply the correct power to the active and semi-active suspension system without vehicle modification.

Some examples of commercially available active seating include the John Deere® Active seat and the Bose Ride® System, which use hydraulic actuators and electrical actuators to compensate for displacement of the seat. Both of these seats are relatively expensive and have a limited ability to be installed in anything other than modem vehicles since it is required that the entire operator seat be replaced. Furthermore, replacement of the operator seat may require modification of the operator station to accommodate a different seat. The current state of the art for vibration isolation for off road vehicle seats is mainly focused on controlling the vibration at the base of the seat, and often times the cushion of the seat is designed for specific stiffness and damping values, however the cushion is not incorporated in the active or semi-active suspension systems.

It is an object of the present disclosure to mitigate or obviate at least one of the above-mentioned disadvantages.

SUMMARY

In one of its aspects, there is provided a vibration damping device for reducing transmissibility of an excitation frequency comprising:
  a top plate;
  a bottom plate;
  a linkage arm arrangement coupled to the top plate and the bottom plate;
  at least one resilient member coupled to the top plate and the bottom plate;
  a load sensor for determining a mass of a load on the top plate;
  at least one accelerometer;
  a damper coupled to the linkage arm arrangement and the top plate, wherein the damper is controllable to modify stiffness of the device.

In another of its aspects, there is provided a method of reducing the transmission of a vibration having an excitation frequency to a seat occupant, the method comprising of the steps of:
  providing a vibration damping device comprising:
    a top plate;
    a bottom plate secured to a base;
    a linkage arm arrangement coupled to the top plate and the bottom plate;
    at least one resilient member coupled to the top plate and the bottom plate;
    a load sensor for determining a mass of a load on the top plate;
    at least one accelerometer;
    a damper coupled to the linkage arm arrangement and the top plate; and wherein the device comprises a natural frequency;
  adjusting stiffness of the device, wherein the stiffness of the device is based on at least one of the natural frequency, mass of the load, and the excitation frequency.

In another of its aspects, there is provided a seat comprising:
  a vibration damping device for reducing transmissibility of an excitation frequency comprising:
    a top plate;
    a bottom plate;
    a linkage arm arrangement coupled to the top plate and the bottom plate;
    at least one resilient member coupled to the top plate and the bottom plate;
    a load sensor for determining a mass of a load on the top plate;
    at least one accelerometer;
    a damper coupled to the linkage arm arrangement and the top plate, wherein the damper is controllable to modify stiffness of the device.

In another of its aspects, there is provided a seat comprising a vibration damping system operable to provide a range of stiffness in real-time based on sensed load on the seat, acceleration of the vehicle, acceleration of the seat and the sensed load, without user input. Furthermore, the system is also tunable to specific vehicle operation to maximize ride comfort for the operator for longer periods, and therefore the vibration damping system allows customization of comfort settings.

Advantageously, there is provided a whole-body vibration attenuating device operable to behave as a high stiffness device at low frequencies (below the cut-off frequency) and a low stiffness device, and without any damping above the cut-off frequency. The device as designed may be in a form factor of an OEM cushion, and therefore the device may be retrofitted into existing OEM seats by replacing the existing OEM cushion on the existing passive suspension seat. The device thus allows for upgrading of any vehicle seat for improved ride comfort at a lower cost compared to existing solutions, and without total replacement of the existing seat system. The whole-body vibration attenuating device may be installed in any vehicle in which an occupant, or operator, is subjected to vehicle vibration transmitted through the seat. Such vehicles may include any one of an off-road working vehicle such as an agricultural, forestry or construction machine; an on-road working vehicle such as a transport or transit vehicle; a military vehicle such as a tank or armoured personnel carrier; an off-road recreational vehicle such as a quad-bike or snowmobile; a personal vehicle such as a car; a specialty vehicle such as a forklift or skid-steer loader.

BRIEF DESCRIPTION OF THE DRAWINGS

Several exemplary embodiments of the present invention will now be described, by way of example only, with reference to the appended drawings in which.

DESCRIPTION

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Figure 1A:
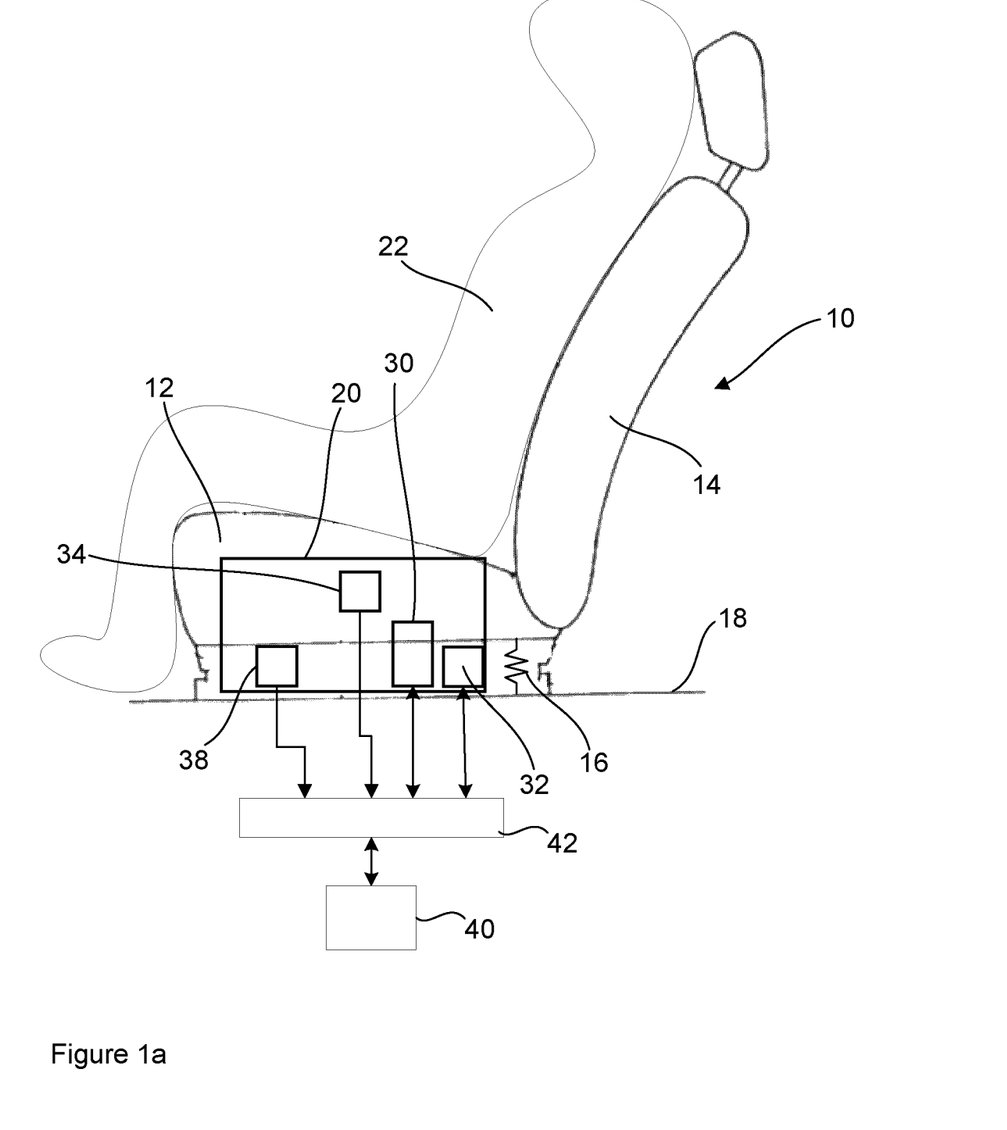
FIG. 1 shows an exemplary vehicle seat, in one implementation.

Looking at FIG. 1a, there is shown a seat 10 comprising seat cushion 12, back 14, and seat suspension 16. Seat 10 is mounted to permanent floor structure 18, such as a base found in a land vehicle, an aircraft, a sea craft, or a building. Seat cushion 12 comprises vibration damping system 20 which allows seat cushion 12 to behave as a high stiffness device at low frequencies (below the cut-off frequency) and a low stiffness device without any damping above the cut-off frequency, in response to an excitation frequency associated with the structure 18. Accordingly, cushion 12 comprising the vibration damping system 20 rests on top of a typical seat suspension 16 consisting of a spring and damper having a single degree of freedom. Therefore, an additional spring and damper system in series with the seat suspension is provided, thereby effecting additional damping to seat 10. Vibration damping system 20 presents a method of vibration control that takes advantage of this additional degree of freedom by transferring energy from the operator mass to the seat mass.

Figure 1B:
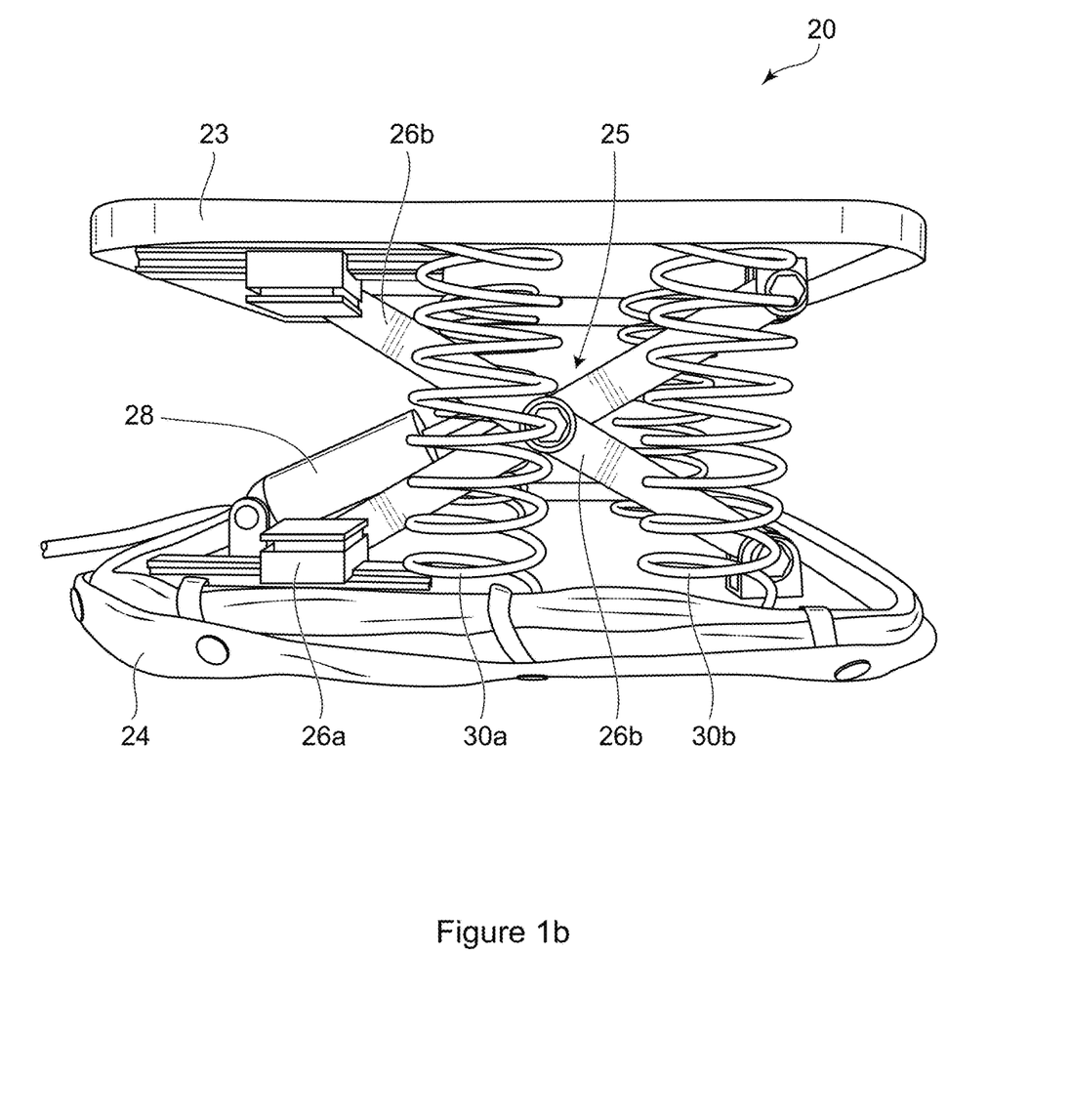
Figure 7:
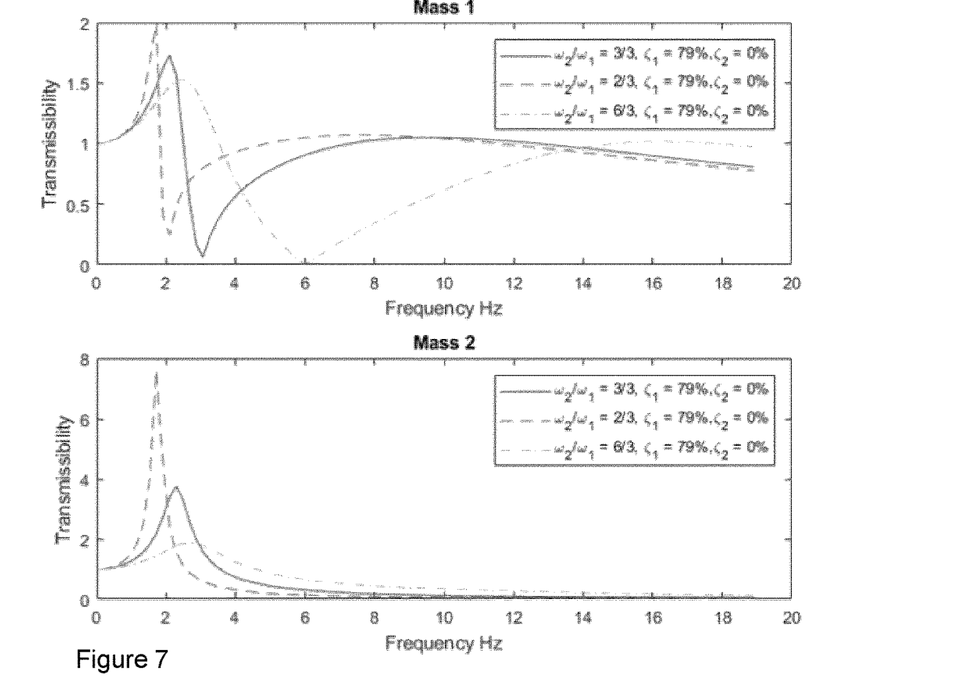
FIG. 7 shows the theoretical transmissibility for different frequency ratios $\omega_2/\omega_1$.

Now referring to FIG. 1b, there is shown vibration damping system 20 that is integrally formed with seat cushion 12 and configured to allow the oscillating or floating movement of seat 10 whereby the shock and/or vibration transmitted through permanent floor structure 18 is fully or substantially absorbed thereby minimizing disturbing seat occupant 22. In more detail, vibration damping system 20 comprises top plate 23 and bottom plate 24 with linkage arm arrangement 25 having linkage arms 26, damper 28, and resilient members 30, as shown in Figure 7b. Looking at FIG. 1a, base accelerometer 32, seat accelerometer 34, operator sensor 38 are communicatively coupled to controller 40 via bus 42. Resilient members 30, such as spring members, are compressible and expandable as the vertical load on the top plate 23 increases or decreases. Base accelerometer 32 measures the acceleration of base 18 and seat accelerometer 34 measures the acceleration of seat 10. Operator sensor 38 detects a part of the load of seat occupant 22 supported by seat 10 and provides an output signal indicative of the amount of the part of the load transferred to cushion 12. The outputs from the base accelerometer 32, seat accelerometer 34 and load sensor 38, and any other sensors are inputted into controller 40 to determine the stiffness of semi-active device 20, and hence cushion 12, and or modify the stiffness of device 20 in real-time.

Controller 40 may include a processor, and a computer readable medium storing instructions executable by the processor to determine the stiffness of semi-active device 20, and hence cushion 12, and or issue a control signal to the damper to modify the stiffness of device 20 in real-time. The processor also generates an instant vibration profile in real-time based on the parameter inputs, sensor outputs, and the excitation frequency. The computer readable medium stores the instant vibration profile, including other historical, or reference, vibration profiles. As such, the instant vibration profile is compared to the plurality of stored vibration profiles in real-time, and processor may issue the control signal to the damper when the instant vibration profile matches one of the plurality of stored vibration profiles.

Figure 2A:
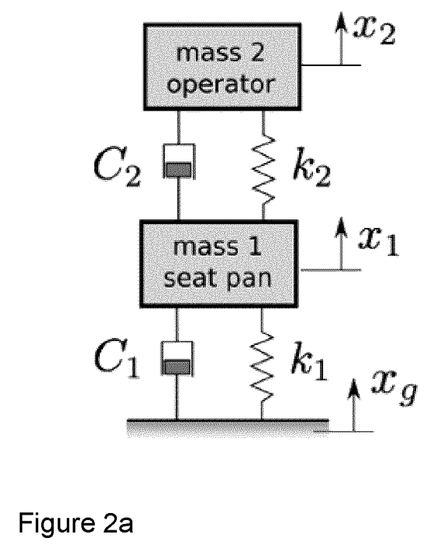
FIG. 2 shows a schematic diagram of a vibration model for a vibration damping device.
Figure 2B:
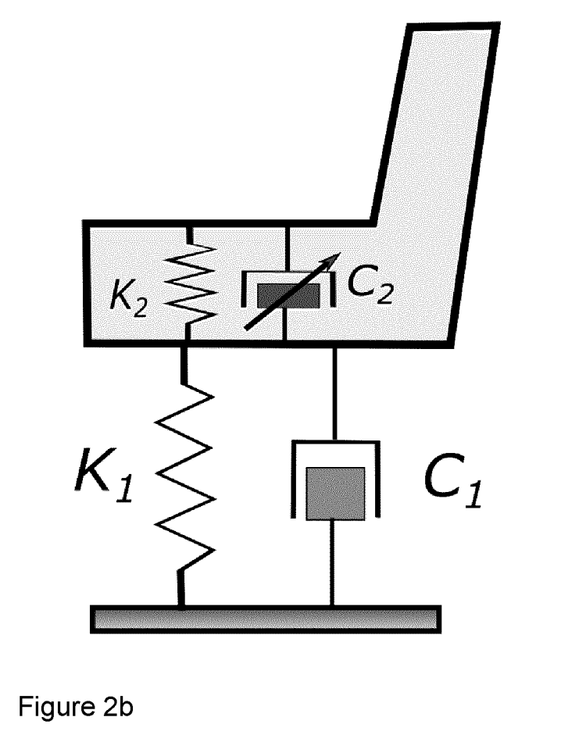

A typical seat suspension can be modelled using a two degree of freedom system with base excitation. FIG. 2 is a schematic diagram showing a vibration model of vibration damping device 20 according to the present exemplary embodiment. As shown in FIG. 1b, generally seat suspension system 16 comprises damper 28 and spring 30 connected between frame 18 of the vehicle and the seat pan. Typically, seat pan comprises some type of foam cushion to provide some level of comfort, and can be sculpted to the human form. Suspension 16 can be simplified into a two degrees of freedom system in which base 18 is the frame of the vehicle or the floor of the cab (for vehicles with suspension systems fitted to the cab) and the motion is defined by $x_g$. Spring rate of seat spring 30 and damper 28 are defined as $k_1$ and $c_1$ respectively, and the mass of the system is defined as m. The motion of seat 10 is defined by $x_1$. The stiffness and damping rate of cushion 12 are defined by $k_2$ and $c_2$, respectively, and the motion of the operator 22 at the cushion 12 is defined by $x_2$. The resulting equation of motion for base excitation for two degrees of freedom can be simplified to the following:

$$M\ddot{x} + C\dot{x} + Kx = F$$

where M, C and K are individual 2×2 matrices. Using this equation, a model for simple proportional viscous damping is developed and is expandable for complex damping, if required. One benefit of this equation is that vehicle chassis 18 acceleration, $x_g$, can be used directly as an input to controller 40. The entire system 20 then undergoes base excitation of a simple sinusoidal excitation over a frequency range between 0 and 20 Hz, and damper $c_2$ in FIG. 2 is controlled to provide variable damping force. As most seat suspensions have some adjustment for the spring preload and the level of damping, then the lower spring-damper pair, $k_1$ and $c_1$, may not be controlled and could be optimized for the best results by adding or reducing damping using the existing components of seat 10. The mass of the operator is defined as $m_2$ and the mass of the seat pan is defined as $m_1$. The matrices M, C and K of the system are as follows:

$$M = \begin{bmatrix} m_1 & 0 \\ 0 & m_2 \end{bmatrix}$$

$$K = \begin{bmatrix} k_1 + k_2 & -k_2 \\ -k_2 & k_2 \end{bmatrix}$$

$$C = \begin{bmatrix} c_1 + c_2 & -c_2 \\ -c_2 & c_2 \end{bmatrix}$$

$$F = -[M]\{1\}\ddot{x}_g = -\begin{bmatrix} m_1 & 0 \\ 0 & m_2 \end{bmatrix}\begin{Bmatrix} 1 \\ 1 \end{Bmatrix}\ddot{x}_g$$

where $\ddot{x}_g$ is the acceleration of base 18 and $\{1\}$ is a vector of ones. In this simplified model it is assumed that any damping in system 20 is proportional to viscous damping. However, in reality, damping in this system 20 is complex and non-proportional which may make parameter isolation difficult.

Solving this system to determine the natural frequencies and the mode shapes is completed by finding the eigenvalues and eigenvectors: $\det|[K]-\omega^2[M]|=0$. The solution of this equation yields the natural frequencies and mode shapes $[\omega^2]$, $[\Phi]$, respectively. The addition of a secondary mass and spring to a single degree of freedom (SDOF) system can eliminate displacement of the original mass at the desired frequency. The mass and stiffness for a tuned mass damper can be selected so that the following equation is satisfied: $m_2/m_1=k_2/k_1$ and therefore $\omega_1=\omega_2$.

In one example, $m_2$ is much larger than $m_1$, for example, the sprung mass of a typical tractor seat 10 without operator 22 may be on the order of 10-20 kg, and the mass of an average operator 22 may be on the order of 80-100 kg. In practice, the operator mass would be smaller as the legs and arms would be supported by other parts of the cab (i.e., floor 18 or steering wheel). Accordingly, it is assumed that the sprung operator mass is between approximately 70% and 85% of the total operator mass, and for simplicity, operator 22 is assumed to be a lumped mass. Generally, the operating frequency for a vehicle is a random input and not a fixed frequency, and therefore the power spectrum of the random input can be described for a vehicle and highest peak of this spectrum is considered the dominant frequency. This frequency is dependent on the mass of the vehicle, the type of running gear (tires or tracks) and the terrain. In one example, the goal for the proposed device 20 is to minimize transmissibility over the spectrum from 0 to 20 Hz.

Figure 3A:
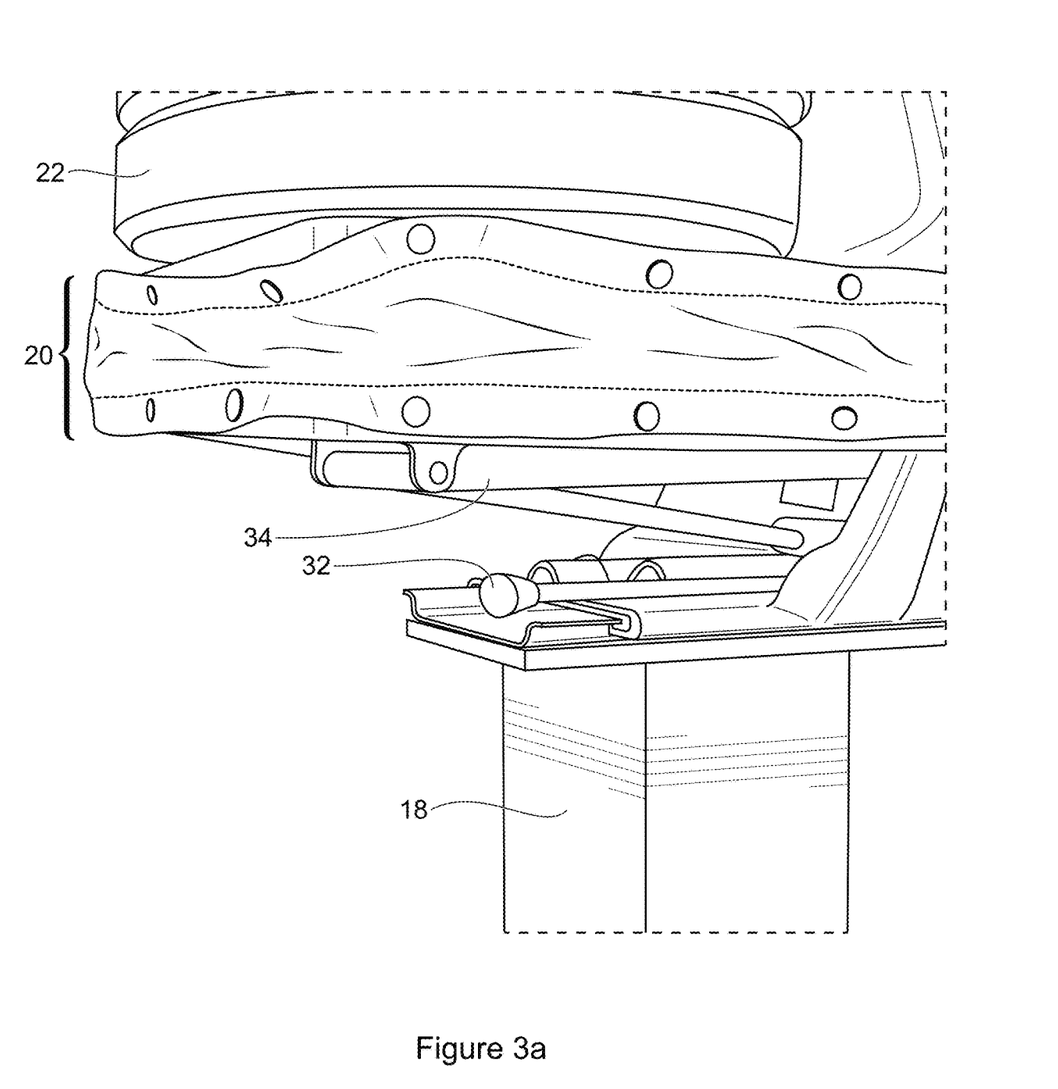
FIG. 3a shows an original equipment manufacturer (OEM) seat under testing.

With the model in hand, a prototype of device 20 was used and simulated to validate the model as well as prove the device concept. In one experiment, an original equipment manufacturer (OEM) seat 10 such a low cost, Model T300 compact tractor seat, manufactured by Darby Manufacturing, Sudbury ON, Canada is employed to develop system 20, as shown in FIG. 3a. OEM seat 10 features a 15 cm suspension travel, and adjustment for ride height and operator mass. Seat 10 has a fixed spring rate with an adjustable pre-load for operator mass ranging from 50 kg to 120 kg and a fixed damping rate.

In more detail, linkage arm arrangement 25 of device 20 consists of two plates 23, 24, made of sheet metal, connected to each other in parallel planes using a scissor mechanism, as shown in FIG. 1b. Scissor mechanism 25 substantially inhibits any lateral and rotational movement of in the system. In one example, scissor mechanism 25 uses bronze bushings on the rotational joints and rails 26 such as the 500 Series Ball Linear Guides from Thompson Industries Inc, Radford, VA U.S.A. at the sliding joints. Four steel compression springs 30, such as those manufactured by Trakar Products Inc., Brantford, ON, Canada, provide the spring stiffness for device 20. Exemplary spring dimensions are shown in Table 1. Springs 30 allows the generation of a quasi-constant force over the complete range of motion of the suspension.

TABLE 1

Trakar Spring Dimensions

| Part number | C7460-488-2032 | |
| --- | --- | --- |
| Outside Diameter | 2.937 in | 74.60 mm |
| Wire Diameter | 0.192 in | 4.88 mm |
| Free Length | 8.0 in | 203.2 mm |
| Maximum Deflection | 5.850 in | 148.6 mm |
| Maximum Load | 60 lbs | 266 N |
| Stiffness | 10.38 lbs/in | 1817 N/m |

Damping for device 20 is provided by a Magneto Rheological (MR) Fluid Damper from Lord Corp., Cary, North Carolina, such as Part Number: RD-8040-1 MR Damper (Short Stroke) damper controlled by the Wonder Box® Device Controller Kit also from Lord Corp. Part number: RD-3002-03. Damper 28 is positioned in device 20 mounted between the rear of lower plate 24 and the central shaft of scissor linkage 25, i.e. the shaft mount position. When mounted in the shaft mount position, damper 28 has a 1:2 mechanical disadvantage acting on the vertical motion of the device 12. Damper 28 may also be mounted in a second position (link mount) which increases the mechanical advantage of damper 28.

Figure 3B:
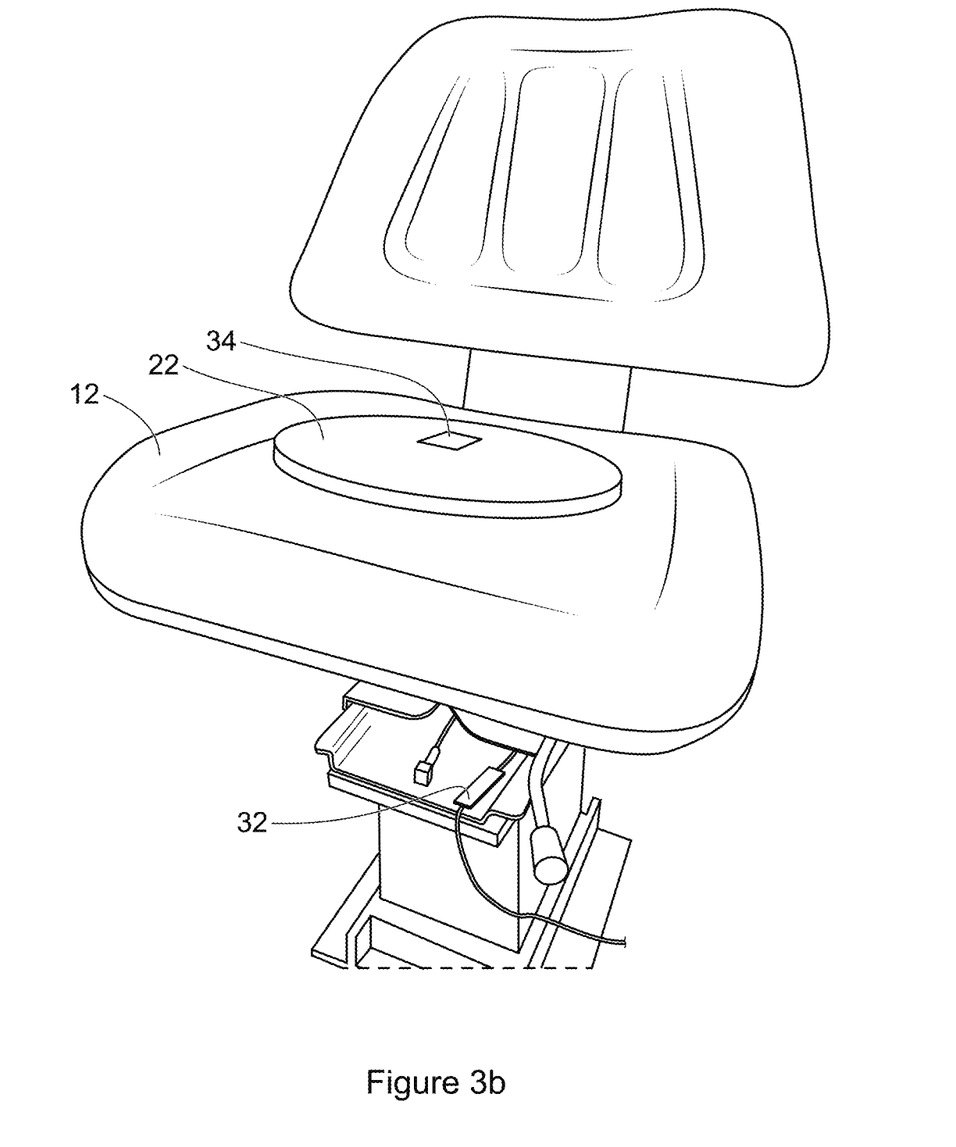
FIG. 3b shows a seat pad transducer on the OEM seat.

Seat 10 is mounted on any apparatus capable of providing base excitation in a vertical direction. An exemplary apparatus is a six degree of freedom hexapod robot, such as the one manufactured by Mikrolar, Hampton, NH, U.S.A., which provides base excitation in the vertical z axis. The static weight capacity of the robot (500 lbs) curbs the motion to 5 mm peak to peak sinusoidal excitation to limit the acceleration, and the excitation frequency range is limited to below 5 Hz based on the capabilities of the hexapod robot. The base excitation is measured with accelerometer 32 positioned on base 18 of seat mount, and the seat acceleration is measured with accelerometer 34 positioned under seat cushion 12 on the travelling portion of stock seat suspension 16. The operator acceleration is measured with an accelerometer positioned in a rubber pad placed on top of seat cushion 12 or seat pan, as shown in FIG. 3b. In one example, accelerometers 32, 34 are Modal array, ceramic shear ICP® accel PCB model 333B40 uniaxial accelerometers from Dalimar Instruments, Vaudreuil, Quebec, Canada, connected to data acquisition unit, such as a USB DAQ model 6341 from National Instruments, Austin Texas, U.S.A.

Figure 4:
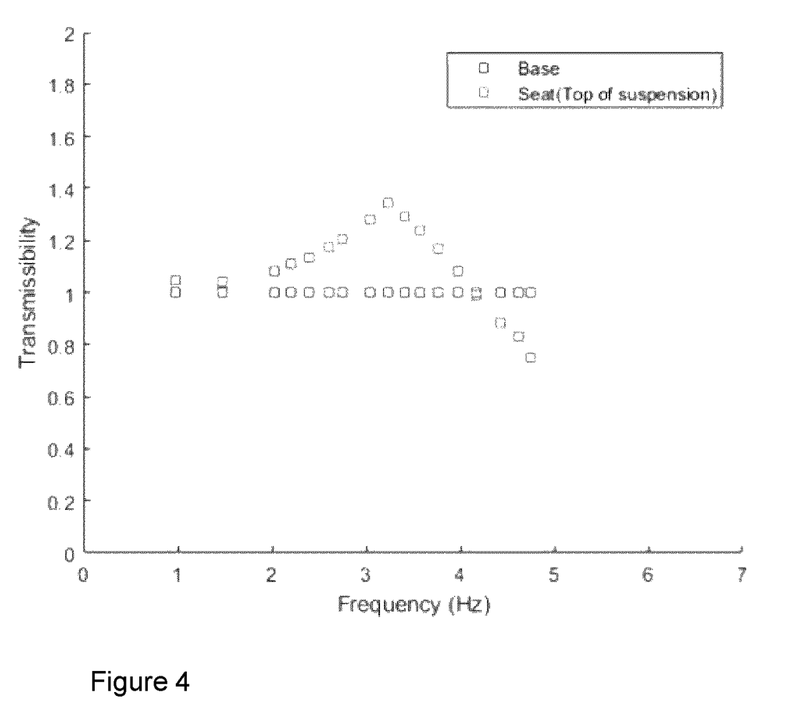
FIG. 4 shows a frequency response function (FRF) plot for a stock seat suspension with a 66.6 kg mass under sinusoidal excitation.

Next, the determination of the spring rate and the damping of seat suspension 16 is completed by removing seat cushion 12 to isolate the seat spring and the damper. A test mass of 66.6 kg, corresponding to an operator mass of 80 kg, is used to determine the natural frequency of the system by finding the resonance. The frequency response function (FRF) plot is shown in FIG. 4, and the parameters are summarized in Table 2.1. Determination of the damping coefficient is estimated by solving for the damping ratio using the equation for Transmissibility Ratio under base excitation:

$$TR = \sqrt{\frac{1 + (2\zeta r)^2}{(1 - r^2) + (2\zeta r)^2}}$$

Substituting for $r = \omega/\omega_n = 1$ corresponding to the peak on the plot where $TR = 1.4$ gives a damping ratio $\zeta$ of 0.79. Damping ratio is defined as, $$\zeta = c/c_c$$

where $c_c$ is the critical damping for the system.

$$c_c = 2\sqrt{km}$$

rearranging for c and solving yields, $$c = 2246 Ns/m$$

The determination of cushion 12 stiffness characteristics for the existing seat employs the method described in SAE J1051 201308 which was used by P.-E. Boileau and S. Rakheja, "Vibration attenuation performance of suspension seats for off-road forestry vehicles,"*International Journal of Industrial Ergonomics*, vol. 5, no. 3, pp. 275-291, 1990. For example, at a pre-load of 540 N and 706 N cushion 12 stiffness is found to be 47700 Nm and 82300 Nm, respectively. The peak response for cushion 12 exceeds 5 Hz, therefore, stiffness for the heavy pre-load provided by P.-E. Boileau and S. Rakheja is used.

TABLE 2.1

Measured stiffness and damping parameters

| | Spring Stiffness | Damping Rate |
| --- | --- | --- |
| Stock Seat Suspension | 28831 N/m | 2246 Ns/m |
| Stock Seat Cushion [35] | 82300 N/m | — |

Determination of $\omega_1$ for stock seat suspension 16 is calculated by the following equation:

$$\omega_1 = \sqrt{\frac{k_1}{m_1 + m_2}}$$

where $m_1 + m_2$ is the combined mass of seat 10 and operator 22. Seat 10 used in the experiment for the 66.6 kg test mass has a natural frequency $\omega_1$ of $$\omega_1 = \sqrt{\frac{28831}{10+66.6}} = 19.4 \text{rad}/s$$

$$\omega_1 = 3 \text{ Hz}$$

This natural frequency is used when determining the difference in response when device stiffness and operator mass are changed.

The model shown in FIG. 2 is similar to that of a quarter car model where $k_1$ and $c_1$ correspond to the stiffness and damping of a rubber tire, and $k_2$ and $c_2$ correspond to the suspension between wheel and vehicle frame. Two of the three control laws provided by J. Moosheimer and H. Waller, "Reduction of vibrations by bang-bang controlled electrorheological dampers," *Archive of Applied Mechanics*, pp. 715-737, 2000, are considered in this experiment and are based on power transferred between the masses. The power dissipated by damper $c_2$ is dependent on the relative velocities of the masses $m_1$ and $m_2$. Control Law 1 is not useful for this type of system, as damping is always "on" when using this law.

Control Law 1

$$P_{C2-2} = -c_2(\dot{x}_2 - \dot{x}_1)\dot{x}_2$$

The power $P_{C2-2}$ of $m_2$ dissipated by $c_2$ is dependent on the velocity of $m_2$ and the relative velocity of the masses. A variable D=[0; 1] is set when damping force should be minimum $F_{Min}$ or maximum $F_{Max}$. Accordingly, D is set using relative velocities of the masses $m_1$, $m_2$ for the following two control laws: Control Law 2 and Control Law 3.

Using Control Law 2, the damper $c_2$ is activated (D=1) only when the damper $c_2$ removes energy from $m_2$.

$$P_{C2-2} = -c_2\dot{x}_2(\dot{x}_2 - \dot{x}_1) \leq 0$$
$$\rightarrow \dot{x}_2(\dot{x}_2 - \dot{x}_1) \geq 0. \rightarrow D=1$$
$$P_{C2-2} = -c_2\dot{x}_2(\dot{x}_2 - \dot{x}_1) > 0$$
$$\rightarrow \dot{x}_2(\dot{x}_2 - \dot{x}_1) < 0. \rightarrow D=0$$

Correspondingly, using Control Law 3 damper $c_2$ (D=1) is activated only when damper $c_2$ removes more energy from $m_2$ than $m_1$ and conversely, adds less energy to $m_2$ than $m_1$.

$$-P_{C1-2} | P_{C2-2} = -c_2\dot{x}_1(\dot{x}_2 - \dot{x}_1) - c_2\dot{x}_2(\dot{x}_2 - \dot{x}_1) \leq 0$$
$$\rightarrow (\dot{x}_2 - \dot{x}_1)(\dot{x}_2 \cdot \dot{x}_1) \geq 0. \rightarrow D=1$$
$$-P_{C1-2} | P_{C2-2} = -c_2\dot{x}_1(\dot{x}_2 - \dot{x}_1) - c_2\dot{x}_2(\dot{x}_2 - \dot{x}_1) > 0$$
$$\rightarrow (\dot{x}_2 - \dot{x}_1)(\dot{x}_2 \cdot \dot{x}_1) < 0. \rightarrow D=0$$

Figure 5:
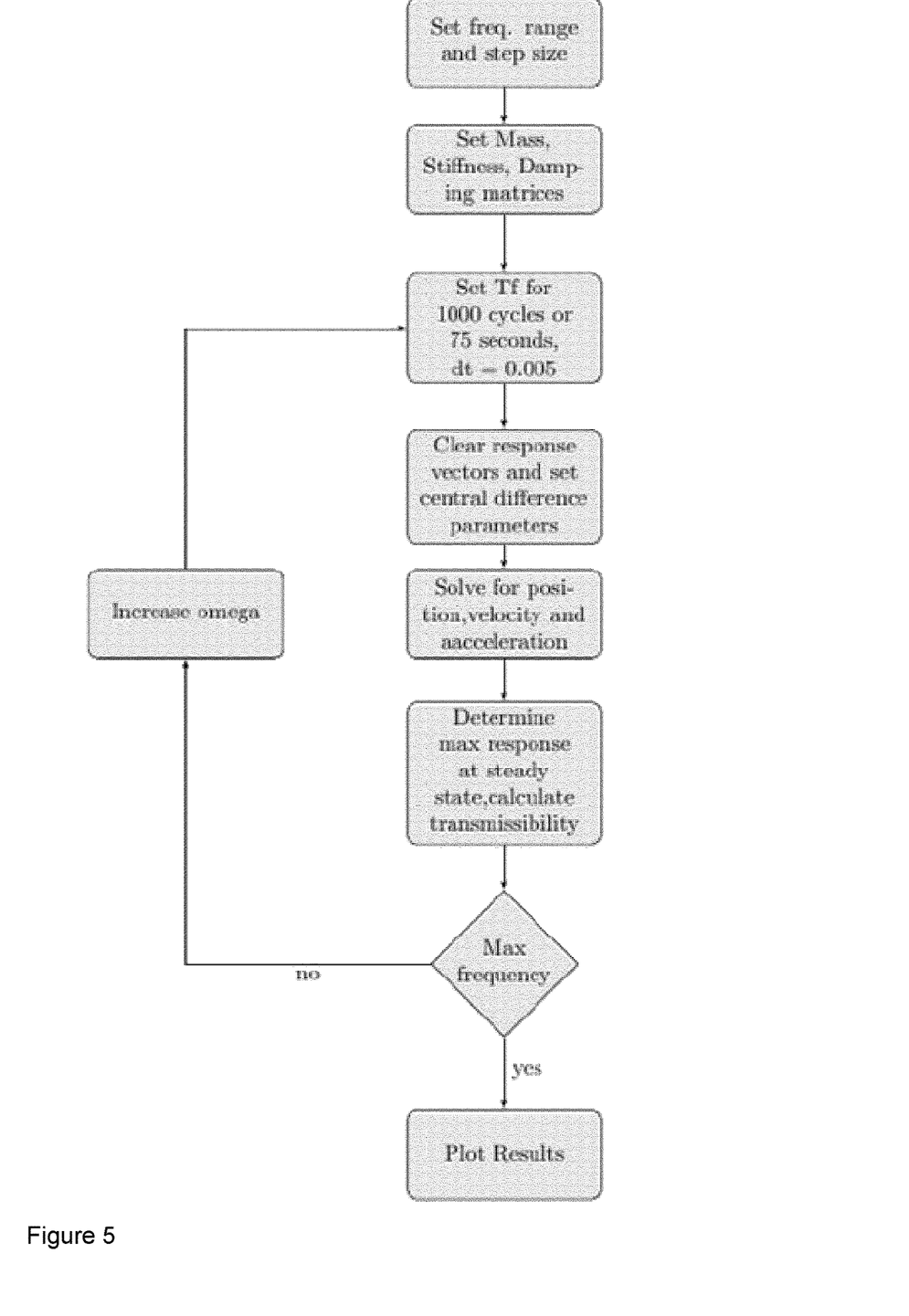
FIG. 5 shows exemplary steps for a central difference method for simulating the vibration model of FIG. 2.

The model is created and simulated using MATLAB R2017b from The MathWorks, Inc. Natick, MA, U.S.A. The model is solved using the central difference method and follows the process shown in FIG. 5. The model is solved numerically for a position relative to base 18, seat 10 and the operator 22 position is corrected by adding the motion of base 18 to each in order to get the position, velocity and acceleration relative to the inertial reference frame. The inertial reference frame is required in this case as operator 22 experiences forces that attempt to accelerate operator 22 away from rectilinear motion at a constant speed. Preferably, operator 22 maintains their trajectory in the inertial frame as the vehicle moves along the earth's surface. This is limited, however, by the physical limitations of the suspension travel so operator 22 is forced to accelerate with the vehicle for large movements. Peak response at each frequency is found once the solution has reached steady state, and the transmissibility ratio (TR) is then calculated by:

$$TR_i = \frac{X_i}{X_{base}}$$

where $X_i$ is the amplitude of the steady state response for each mass and $X_{base}$ is the amplitude of the base motion. The transmissibility is determined for frequencies between 0.5 Hz and 18.9 Hz with a step size of 0.191 Hz.

Figure 6:
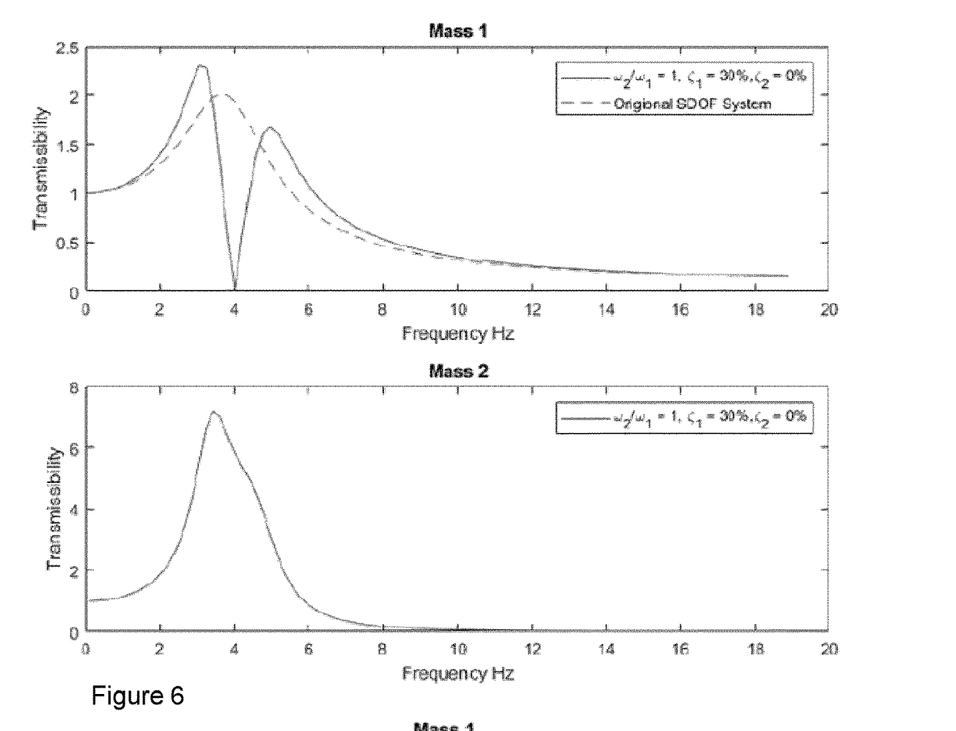
FIG. 6 shows a frequency response function plot of the system of FIG. 2.

The frequency response function (FRF) of the system presented in FIG. 2 is shown in FIG. 6, and the stiffness and damping parameters are shown in Table 2.2. Looking at FIG. 6 it can be seen that the base 18 undergoes 5 mm peak to peak sinusoidal motion over the frequency range 0.08 Hz to 20 Hz, and separation of the peaks in the system is dependent on the mass ratio $m_1/m_2$. It is evident that a relatively small absorber mass will have no effect whereas a large mass separates the peaks of the system. For a normal tuned mass damper, isolation of $m_1$ is desirable. For an operator suspension system such as the prototype device 20, isolation of $m_2$, (i.e., machine operator 22), is desired.

TABLE 2.2

Parameters for a 2DOF system with 5 mm Peak-Peak base excitation

| Variable | original SDOF | With TMD |
|---|---|---|
| $m_1$ | 100 kg | 100 kg |
| $m_2$ | — | 20 kg |
| $k_1$ | 63165 N/m | 63165 N/m |
| $k_2$ | — | 12633 N/m |
| $c_1$ | 1508 Ns/m ($\zeta_1$ = 30%) | 1508 Ns/m ($\zeta_1$ = 30%) |
| $c_2$ | — | 0% |

The frequency response function in FIG. 6 shows that when the operating frequency is 4 Hz then $m_1$ is totally isolated from the base movement; however, $m_2$ experiences an amplification 5.8 times the motion of base 18.

Now turning to the simulation results of device 20, as the election of device stiffness is one factor for consideration when designing device 20 for specific applications, the effects that device stiffness has on the response is determined. Accordingly, three frequency ratios are selected for a generic seat system with the parameters shown in Table 2.3 The assumption that input vibration does not cause device 20 to exceed the designed travel limits simplifies the model further, that is, end-stops prevent the device travel to be exceeded. The masses $m_1$, $m_2$ are selected for simplicity to correspond to a 100 kg operator 22 and a mass ratio $m_1/m_2$=5. For convenience, seat suspension stiffness is selected to provide a 3 Hz natural frequency with these masses $m_1$, $m_2$. The frequency determined in the SDOF seat suspension test is shown below:

$$\omega_1 = \sqrt{\frac{k_1}{m_1 \mid m_2}}$$

and so $$k_1 = (\omega)^2(m_1 \mid m_2)$$

$$k_1 = (2\pi 3)^3(120) = 42637 N/m$$

The stiffness of device 20 is then selected to satisfy three frequency ratios. These ratios are selected to show a reduced stiffness and an increased stiffness within the realistic range of natural frequency that could be set for device 20.

$$r = \frac{\omega_2}{\omega_1} = 1.\frac{2}{3}, \frac{6}{3}$$

TABLE 2.3

Table of parameters for different device stiffness.

| Variable | Seat with Device | |
|---|---|---|
| $m_1$ | 20 | kg |
| $m_2$ | 100 | kg |
| $k_1$ | 42637 | N/m |
| $k_2$ | 35531.15791 and 142120 | N/m |
| $c_1$ | 2244 ($\zeta_1$ = 79%) | Ns/m |
| $c_2$ | 0 | % |

Figure 10:
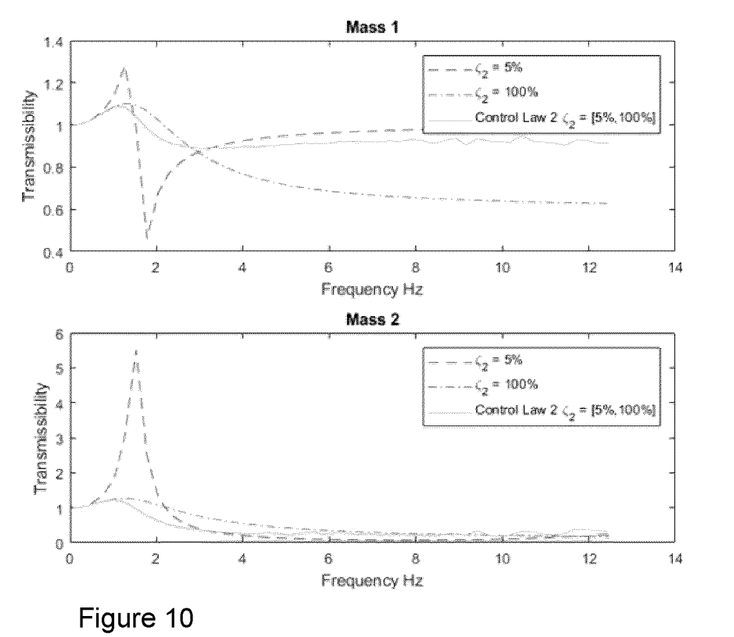
FIG. 10 shows the theoretical transmissibility minimum damping, critical damping using Control Law 2 strategy.
Figure 11:
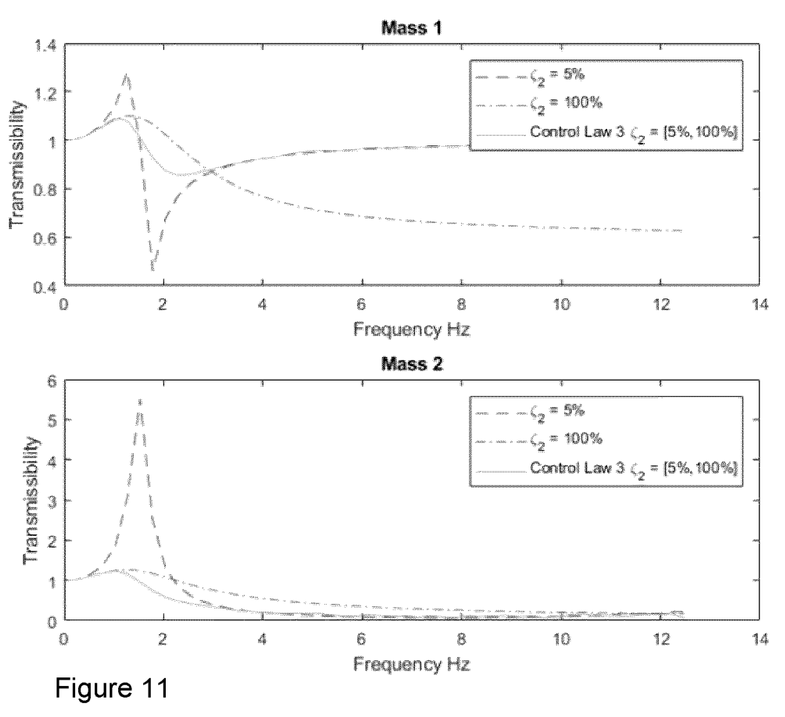
FIG. 11 shows the theoretical transmissibility minimum damping, critical damping using Control Law 3 strategy.

The plots for the different frequency ratios are shown in FIG. 7. The values for the measured stiffness and damping of prototype device 20 are shown in Table 2.4. Simulation of a tractor seat with prototype device 20 installed is completed and the results are shown in FIGS. 10 and 11. In this situation the operator mass is lowered from 100 kg in the previous simulations to 66.8 kg as this is a limiting factor for the robot capacity, in this particular implementation. The 66.8 kg lumped mass corresponded to an approximate operator mass of 83 kg when accounting for the weight of the operator's legs being supported by floor 18 of the cab. The sprung weight of the of the OEM seat components is measured to be 4.2 kg.

Each of FIGS. 10 and 11 shows a plot for minimum damping ($\zeta$=5%), critical damping ($\zeta$=100%) and using a bang-bang control strategy. The frequency range for these simulations is reduced from 0.5-18.9 Hz to 0.5-13 Hz as the plots become asymptotic above 10 Hz. Reducing the range to 13 Hz also provides better resolution to the plots for visualization.

TABLE 2.4

Parameters for the prototype device installed on the small tractor seat.

| Variable | Seat with prototype device | |
|---|---|---|
| $m_1$ | 4.2 | kg |
| $m_2$ | 66.8 | kg |
| $k_1$ | 28831 | N/m |
| $k_2$ | 7270.9 | N/m |
| $c_1$ | 2244.4 | Ns/m |
| $c_2$ | 0 | Ns/m |

Figure 8:
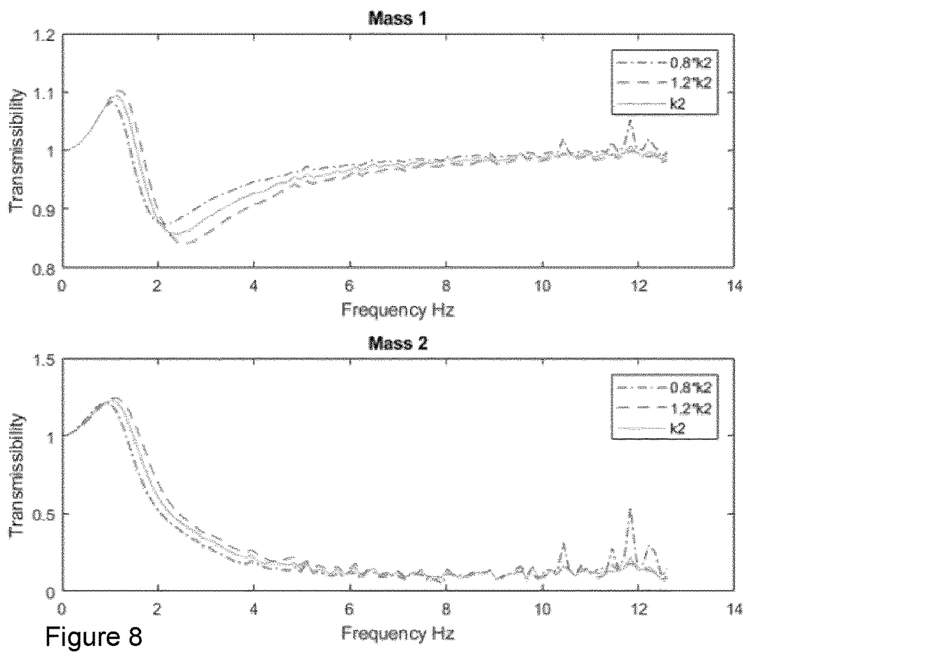
FIG. 8 shows how the transmissibility changes when adjusting stiffness of the device.
Figure 9:
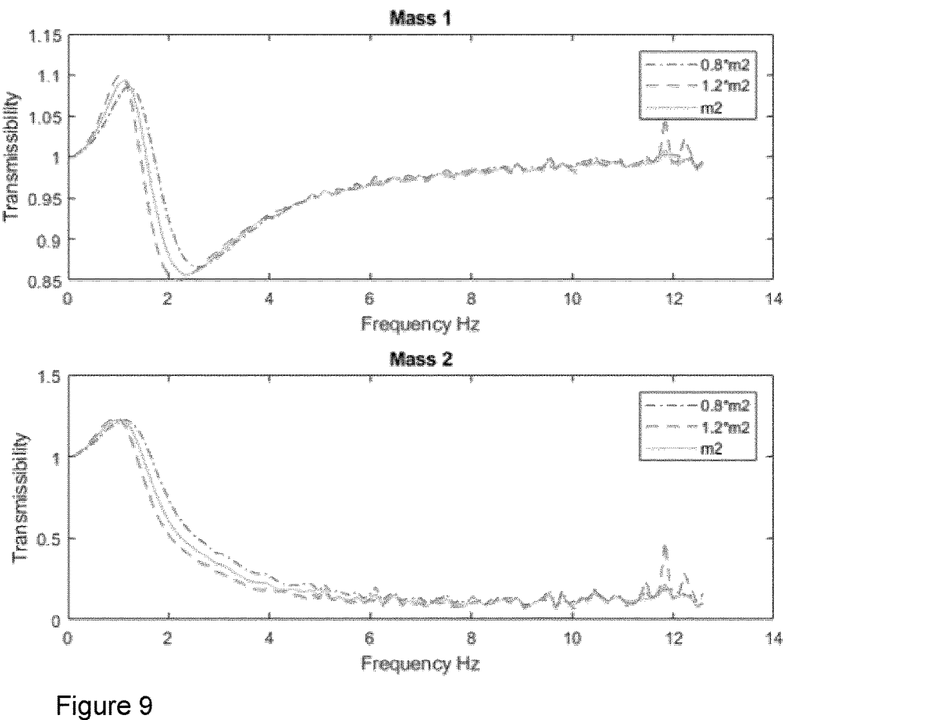
FIG. 9 shows how the transmissibility changes when adjusting stiffness of the device.

The previous simulations consider only one set of variables of the OEM seat suspension and are not generalized for all seat suspensions. To better understand how uncertainties with OEM seat stiffness and how different operator masses ($m_2$) affect the response, simulations are completed with reduced and increased stiffness and mass. Both simulations are completed using Control Law 3 as this control strategy provided the most reduction in transmissibility. FIG. 8 shows how the transmissibility changes when adjusting stiffness of device 20. FIG. 9 shows how the transmissibility changes when adjusting stiffness of device 20.

For the typical tuned mass damper shown in FIG. 6 when $m_1$ is much greater than $m_2$, there is complete isolation of $m_1$ at the designed natural frequency of the absorber 18. This type of system would not be practical for a seat suspension as the desired outcome is isolation of $m_2$. In another implementation, a tuned mass damper of this type may comprise a third absorber mass associated with back 14 of seat 10. This type of device, however, would still be limited as it would be designed to isolate one operating frequency. The response shown in FIG. 7 corresponds to a system where $m_2$ is much heavier than $m_1$. Increasing the device stiffness reduces the maximum transmissibility for $m_2$, but is not as effective above the cut-off frequency. When the device stiffness is designed for a natural frequency that is lower than the OEM seat stiffness, device 20 is effective at isolation of $m_2$ above the cut-off frequency. However, the drawback of a low device stiffness is the requirement for more damping to limit the maximum transmissibility. More damping increases the complexity of device 20 and increases the minimum damping that can be achieved. Ideally the device damping would have a large dynamic range for control to allow for very low damping when turned off and very high damping when on. In practice, commercially available controlled dampers have a limited dynamic range. The importance of limiting peak transmissibility means that damper selection will err on the side of higher damping.

Implementation of the control strategies are both effective for a damper that could achieve critical damping for the devices designed stiffness and operator mass. With the control, FIGS. 10 and 11, show similar improvements in transmissibility, however, Control Law 3 shows lower transmissibility over the entire frequency range above resonance. With Control Law 3, more energy is transferred to $m_1$ from $m_2$. This control strategy is preferred for device 20, however, when the existing seat incorporates armrest mounted controls, this may have a negative effect other aspects during operation as the armrest will still move with the seat pan in some vehicles. Also, the relative movement of the operator with controls in the cab may be a distraction.

Accordingly, the model serves a useful purpose for designing the stiffness and damping values for a field ready device 20 and helps to define the form factor for device 20.

In another exemplary implementation, end-stop design is determined by the availability of space within device 20, and interaction of the end-stop mechanics may be incorporated into the model.

In another exemplary implementation, the design of device 20 is robust enough to handle uncertainties with OEM seat stiffness variability as well as a range of operator masses. For example, simulation results shown in FIG. 8, show only slight variation in frequency response for a 20% variation in OEM seat stiffness. Similarly, from FIG. 9, a 20% variation in operator mass do not result in a drastic change in model response.

In another exemplary implementation, device 20 is controllable to provide a variable damping rate. Accordingly, resilient members 30 are controllable to expand and contract in response to a control signal by controller 40, wherein the control signal is based on the measurements from base accelerometer 32 and seat accelerometer 34, thereby damping the detected vibrations.

In another exemplary implementation, device 20 is controllable to provide a variable damping rate that is optimized for a given application.

In another exemplary implementation, the linkage arm arrangement may be a pantograph.

In another exemplary implementation, device 20 comprises a plurality of sensors to provide various measurements such as relative position or the relative velocity of seat 10 with respect to base 18, and the sensor outputs are inputted in the controller 40 to provide control signals to damper 28.

In another exemplary implementation, a rotary type damper or a piston damper without no gas pre-load is used to minimize some of the non-linear effects.

In another exemplary implementation, a friction damper is used to minimize some of the non-linear effects.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the steps recited in any of the method or process claims may be executed in any order and are not limited to the order presented. Thus, the preceding detailed description is presented for purposes of illustration only and not of limitation, and the scope of the invention is defined by the preceding description, and with respect to the attached claims.

What is claimed is:

1. A vibration damping device for reducing transmissibility of an excitation frequency, the device comprising:
   a top plate;
   a bottom plate;
   a linkage arm arrangement coupled to the top plate and the bottom plate; at least one resilient member coupled to the top plate and the bottom plate;
   a load sensor for determining a mass of a load on the top plate;
   at least one accelerometer; and
   a damper coupled to the linkage arm arrangement and the top plate, wherein the damper is controllable to modify stiffness of the device;
   wherein the device comprises a natural frequency and wherein the stiffness of the device is based on at least one of the natural frequency, the mass of the load, and the excitation frequency;
   wherein the stiffness of the device is high below a cut-off frequency of the device, and the stiffness of the device is low above the cutoff frequency of the device;
   wherein the excitation frequency is associated with a base, and wherein the bottom plate is secured to the base, and the excitation frequency is transmitted to a seat, on the base, supporting an occupant;
   a controller for receiving parameter inputs from the load sensor, and the at least one accelerometer;
   at least one sensor for sensing an absolute value or a change in a physical quantity and generate a corresponding signal for input into the controller to provide a control signal to the damper, and
   wherein the controller determines at least one of a relative position of the seat with respect to the base based on at least an output from the at least one sensor and a relative velocity of the seat with respect to the base based on at least an output from the at least one sensor.

2. The vibration damping device of claim 1, wherein the device comprises a form factor similar to a foam cushion of the seat.

3. The vibration damping device of claim 1, wherein the controller comprises a memory with computer readable instructions stored thereon, the instructions executable by a processor to issue the control signal to the damper to modify the stiffness of the device based on the parameter inputs and the excitation frequency.

4. The vibration damping device of claim 3, wherein the controller generates an instant vibration profile in real-time based on the parameter inputs and the excitation frequency, and the controller issues the control signal, without user intervention.

5. The vibration damping device of claim 4, wherein the memory comprises a plurality of stored vibration profiles, and wherein the instant vibration profile is compared to the plurality of stored vibration profiles in real-time, and the controller issues the control signal when the instant vibration profile matches one of the plurality of stored vibration profiles.

6. The vibration damping device of claim 1, wherein the linkage arm arrangement is a pantograph.

7. A method of reducing the transmission of a vibration having an excitation frequency to a seat occupant, the method comprising of the steps of:
   providing a vibration damping device comprising:
      a top plate;
      a bottom plate secured to a base;
      a linkage arm arrangement coupled to the top plate and the bottom plate;
      at least one resilient member coupled to the top plate and the bottom plate;
      a load sensor for determining a mass of a load on the top plate;
      at least one accelerometer;
      a damper coupled to the linkage arm arrangement and the top plate; and
   wherein the device comprises a natural frequency;
   adjusting stiffness of the device, wherein the stiffness of the device is based on at least one of the natural frequency, the mass of the load, and the excitation frequency;
      wherein the device comprises a natural frequency and wherein the stiffness of the device is based on at least one of the natural frequency, the mass of the load, and the excitation frequency;

wherein the stiffness of the device is high below a cut-off frequency of the device, and the stiffness of the device is low above the cutoff frequency of the device;

wherein the excitation frequency is associated with a base, and wherein the bottom plate is secured to the base, and the excitation frequency is transmitted to a seat, on the base, supporting an occupant;

a controller for receiving parameter inputs from the load sensor, and the at least one accelerometer;

at least one sensor for sensing an absolute value or a change in a physical quantity and generate a corresponding signal for input into the controller to provide a control signal to the damper, and wherein the controller determines at least one of a relative position of the seat with respect to the base based on at least an output from the at least one sensor and a relative velocity of the seat with respect to the base based on at least an output from the at least one sensor.

8. The method of claim 7, wherein the controller comprises a memory with computer readable instructions stored thereon, the instructions executable by a processor to at least issue the control signal to the damper to modify the stiffness of the device based on at least one of the parameter inputs and the excitation frequency.

9. The method of claim 7, wherein the device is associated with a seat having at least one degree of motion, and wherein the at least one accelerometer is associated with the at least one degree of motion.

10. The method of claim 8, further comprising a step of generating an instant vibration profile in real-time based on at least one of the parameter inputs and the excitation frequency.

11. The method of claim 10, wherein the memory comprises a plurality of stored vibration profiles, and wherein the instant vibration profile is compared to the plurality of stored vibration profiles in real-time, and the control signal is issued when the instant vibration profile matches one of the plurality of stored vibration profiles.

12. The method of claim 8, wherein the controller issues the control signal to the damper without user intervention.

13. A seat comprising:
a vibration damping device for reducing transmissibility of an excitation frequency comprising:
a top plate;
a bottom plate;
a linkage arm arrangement coupled to the top plate and the bottom plate;
at least one resilient member coupled to the top plate and the bottom plate;
a load sensor for determining a mass of a load on the top plate;
at least one accelerometer; and
a damper coupled to the linkage arm arrangement and the top plate, wherein the damper is controllable to modify stiffness of the device;
wherein the device comprises a natural frequency and wherein the stiffness of the device is based on at least one of the natural frequency, the mass of the load, and the excitation frequency;
wherein the stiffness of the device is high below a cut-off frequency of the device, and the stiffness of the device is low above the cutoff frequency of the device;
wherein the excitation frequency is associated with a base, and wherein the bottom plate is secured to the base, and the excitation frequency is transmitted to the seat, on the base, supporting an occupant;
a controller for receiving parameter inputs from the load sensor, and the at least one accelerometer;
at least one sensor for sensing an absolute value or a change in a physical quantity and generate a corresponding signal for input into the controller to provide a control signal to the damper, and
wherein the controller determines at least one of a relative position of the seat with respect to the base based on at least an output from the at least one sensor and a relative velocity of the seat with respect to the base based on at least an output from the at least one sensor.

14. The seat of claim 13, wherein the damper receives the control signal to modify the stiffness of the device in real-time based on at least one of the excitation frequency, the mass of the load, and an output from the at least one accelerometer.

15. The seat of claim 14, wherein the control signal is issued without user intervention.

16. The seat of claim 13, wherein the damper comprises variable damping.

* * * * *